United States Patent
Roque et al.

(10) Patent No.: US 10,926,686 B2
(45) Date of Patent: Feb. 23, 2021

(54) APPARATUS FOR A DUMP TRUCK AND METHOD

(71) Applicants: Elio Roque, Miami Gardens, FL (US); Dean Gil, Hialeah, FL (US); Ever Roque, Miami Gardens, FL (US)

(72) Inventors: Elio Roque, Miami Gardens, FL (US); Dean Gil, Hialeah, FL (US); Ever Roque, Miami Gardens, FL (US)

( * ) Notice: Subject to any disclaimer, the term of this patent is extended or adjusted under 35 U.S.C. 154(b) by 82 days.

(21) Appl. No.: 16/114,125

(22) Filed: Aug. 27, 2018

(65) Prior Publication Data
US 2019/0061592 A1 Feb. 28, 2019

Related U.S. Application Data

(60) Provisional application No. 62/550,480, filed on Aug. 25, 2017.

(51) Int. Cl.
*B60P 1/273* (2006.01)
*E05B 83/02* (2014.01)
*E05C 3/12* (2006.01)

(52) U.S. Cl.
CPC .............. *B60P 1/273* (2013.01); *E05B 83/02* (2013.01); *E05C 3/124* (2013.01)

(58) Field of Classification Search
CPC ... B60P 1/273; B62D 33/037; B62D 33/0273; E05B 83/02; E05C 3/124
USPC .......................................................... 296/56
See application file for complete search history.

(56) References Cited

U.S. PATENT DOCUMENTS

| | | | |
|---|---|---|---|
| 3,811,729 A | 5/1974 | Vornberger | |
| 4,307,541 A * | 12/1981 | Farmer | B62D 33/037 296/56 |
| 4,691,956 A * | 9/1987 | Hodge | B60P 1/26 292/DIG. 29 |
| 5,143,496 A * | 9/1992 | Smith | B60P 1/26 296/35.3 |
| 5,174,632 A | 12/1992 | Hagenbuch et al. | |
| 7,591,513 B2 * | 9/2009 | Morley | B60P 1/26 298/23 MD |
| 7,731,297 B1 | 6/2010 | Ozanich | |
| 8,182,046 B1 | 5/2012 | Hauth et al. | |
| 8,746,805 B1 * | 6/2014 | Petzitillo, Jr. | B60P 1/16 298/23 M |
| 8,944,484 B2 | 2/2015 | Kibler et al. | |
| 2004/0207517 A1 | 10/2004 | Cole | |
| 2014/0265518 A1 * | 9/2014 | Kibler | B60P 1/26 298/23 S |
| 2019/0301210 A1 * | 10/2019 | Shoopman | E05B 81/10 |

* cited by examiner

*Primary Examiner* — Jason S Morrow
(74) *Attorney, Agent, or Firm* — Runyan Law; Charles Runyan

(57) ABSTRACT

An apparatus for a dump truck includes a catch affixable to one of the tailgate and the open-box bed of the dump truck, a latch affixable to the other of the tailgate and the open-box bed of the dump truck, a face cam affixable to the chassis or the open-box bed of the dump truck, a follower fixed to the latch, and a return spring affixable to the other of the tailgate and the open-box bed, and coupled to the follower. The apparatus is useful for providing a secondary locking device by engaging a tailgate or door assembly on a dump truck.

18 Claims, 5 Drawing Sheets

APPARATUS FOR A DUMP TRUCK AND METHOD

CROSS-REFERENCE TO RELATED APPLICATION(S)

The present application is related to and claims priority to U.S. Provisional Patent Application No. 62/550,480 filed Aug. 25, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Technical Field

The present invention relates generally to the field of dump truck vehicles of existing art and more specifically relates to a dump truck tailgate lock.

Related Art

A dump truck is a truck used for transporting loose material for construction. A typical dump truck is equipped with an open-box bed, which is hinged at the rear and equipped with hydraulic pistons to lift the front, allowing the material in the bed to be deposited on the ground behind the truck at the site of delivery.

On many occasions the load force of a truck has overcome the current cylinder mechanism with air pressure. This can result in the lid opening and material spilling onto the roadway, causing fatal accidents and damage to public and private property. It can also cause the driver not to meet scheduled delivery times. A suitable solution is desired.

U.S. Pat. No. 3,811,729 to G. Vornberger relates to a dump trailer having an automatic tailgate lock. The described dump trailer having automatic tailgate lock includes a dump truck trailer body having a swinging tailgate engaged by a pneumatically operated locking arrangement comprising a swinging spring biased locking hook operatively attached to a pneumatic cylinder which is actuated to disengage the locking hook from the swinging tail gate and permit gate opening. Release of air pressure from the pneumatic operating cylinder allows the hook biasing springs to force the locking hook into locking engagement with the lower portion of the swinging tailgate.

SUMMARY OF THE INVENTION

In view of the foregoing disadvantages inherent in the known dump truck vehicle art, the present disclosure provides a novel apparatus for a dump truck and method. The general purpose of the present disclosure, which will be described subsequently in greater detail, is to provide a semi-automatic mechanism that is added as a secondary locking device for a dump truck.

An apparatus for a dump truck is disclosed herein. The apparatus may include a catch affixable to one of the tailgate and the open-box bed of the dump truck, a latch affixable to the other of the tailgate and the open-box bed of the dump truck, a face cam affixable to the chassis or the open-box bed of the dump truck, a follower fixed to the latch, and a return spring affixable to the other of the tailgate and the open-box bed, and coupled to the follower. The apparatus may be useful for providing a secondary locking device by engaging a tailgate or door assembly on a dump truck.

According to another embodiment, a method of locking a tailgate of a dump truck is also disclosed herein. The method may include providing a tailgate locking apparatus including a catch, a latch, a face cam, a follower, and a return spring, affixing the catch to one of the tailgate and the open-box bed of the dump truck, affixing the latch to the other of the tailgate and the open-box bed of the dump truck, affixing the face cam to the chassis of the dump truck, affixing the return spring to the other of the tailgate and the open-box bed, and engaging the latch by securing the face cam with the catch.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an apparatus for a dump truck and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a dump truck tailgate lock and more particularly to an apparatus for a dump truck as used to provide a semi-automatic mechanism that may be added as a secondary locking device for a dump truck.

Generally, the present invention may provide a semi-automatic mechanism that is added as a secondary locking device for a dump truck. It may comprise a vertically actuated lock that may be configured to engage a tailgate or door assembly on a dump truck. This may offer a secondary locking system in the event that the primary pneumatic lock fails. The apparatus may assist in avoiding road accidents produced by flaws in the currently known closing mechanisms. The present invention may allow manufacturers to add the mechanism to new trucks or retrofit onto existing dump truck models.

The apparatus may be comprised of a semi-automatic mechanism that is added to the original closing of the dump. It may be made up of a vertically actuated lock that is configured to engage a tailgate or door assembly on a dump truck. The apparatus may be constructed from a plurality of metals and other materials and may be designed to weigh less than seven pounds. Materials may include a 2×½ metal sheet and a 2×2×¼ square beam. The device may also include 3×3×⅜ metal angles unprocessed, a 25/32 round bar, a 1½ round bar, ⅜ screws, and a 3×1×⅛ compression spring. The assembly may use the existing mechanism with air cylinder to move the mechanical locking mechanism vertically in two directions. The locking system may function with the same activation valve for the existing pneumatic cylinder from within the cabin. The exact specifications may vary by application Upon reading this specification, it should be appreciated that, under appropriate circumstances, considering such issues as user preferences, design preference, structural requirements, marketing preferences, cost, available materials, technological advances, etc., other locking arrangements such as, for example, manual covers, etc., may be sufficient.

Referring now more specifically to the drawings by numerals of reference, there is shown in FIGS. 1-4, various views of an apparatus 100 for a dump truck 10.

Figure 1:
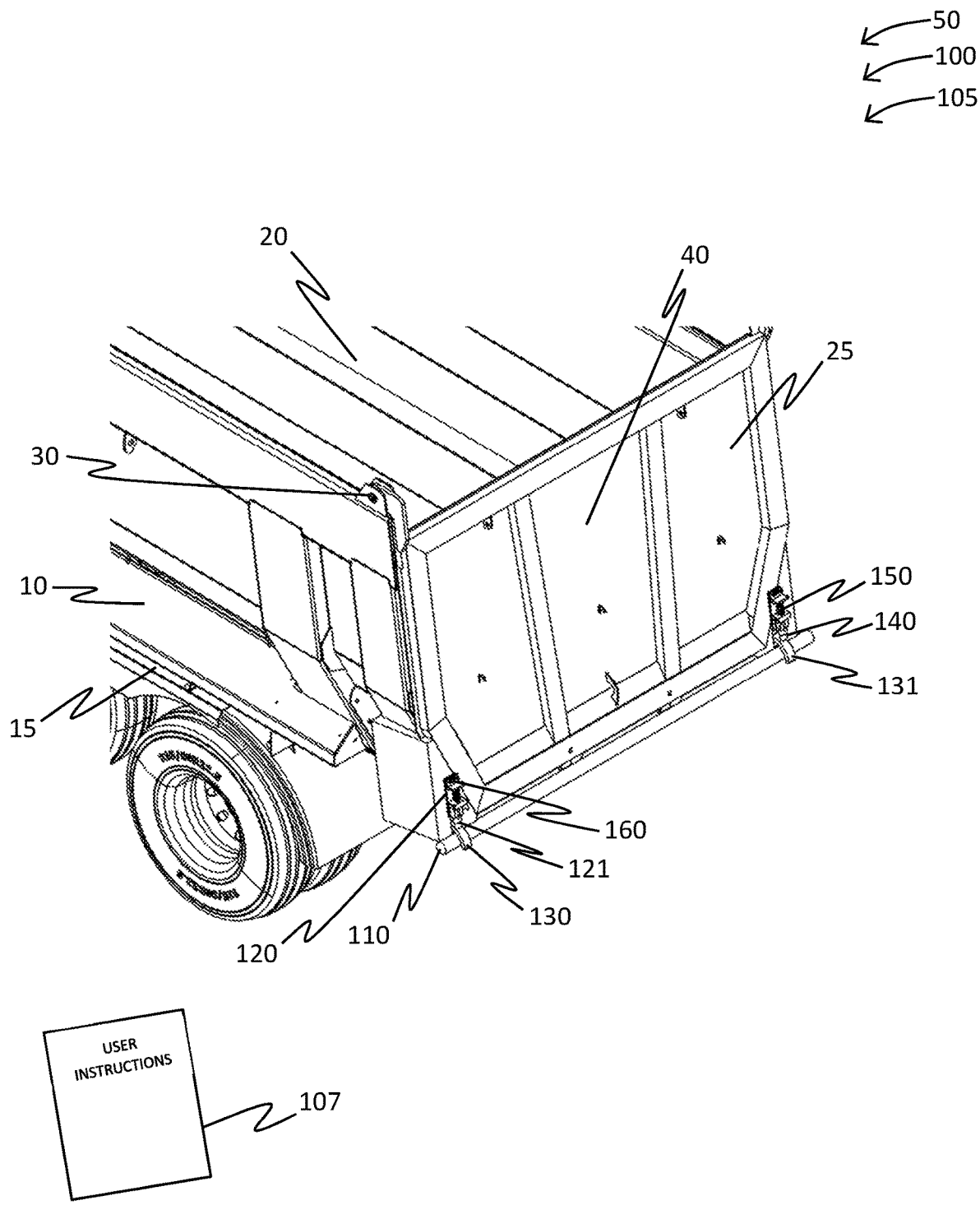
FIG. 1 is a perspective view of the apparatus for a dump truck during an 'in-use' condition, according to an embodiment of the disclosure.

FIG. 1 shows an apparatus 100 for a dump truck 10 during an 'in-use' condition 50, according to an embodiment of the present disclosure. Here, the apparatus 100 may be beneficial for use by a user to provide a semi-automatic mechanism that may be added as a secondary locking device for a dump truck 10 including a chassis 15, an open-box bed 20, a tailgate 25, and top hinges 30. The tailgate 25 of the dump truck 10 may be configured to pivot up on the top hinges 30 to an open state (not shown in FIG. 1) and pivot down to a closed state 40. As illustrated, the apparatus 100 may include a catch 110 affixable to one of the tailgate 25 and the open-box bed 20 of the dump truck 10, a latch 120 affixable to the other of the tailgate 25 and the open-box bed 20 of the dump truck 10, a face cam 130 having a curved shape 131 and affixable to the chassis 15 or the open-box bed 20 of the dump truck 10, a follower 140 fixed to the latch 120, a return spring 150 affixable to the other of the tailgate 25 and the open-box bed 20. The return spring 150 and the follower 140 together may be configured to normally hold the latch 120 in an engaged state 121 with the catch 110, and similarly to move the latch 120 to a disengaged state.

According to one embodiment, the apparatus 100 for a dump truck 10 may be arranged as a kit 105. In particular, the apparatus 100 may further include a set of instructions 107. The instructions 107 may detail functional relationships in relation to the structure of the apparatus 100 such that the apparatus 100 can be used, maintained, or the like, in a preferred manner.

Figure 2:
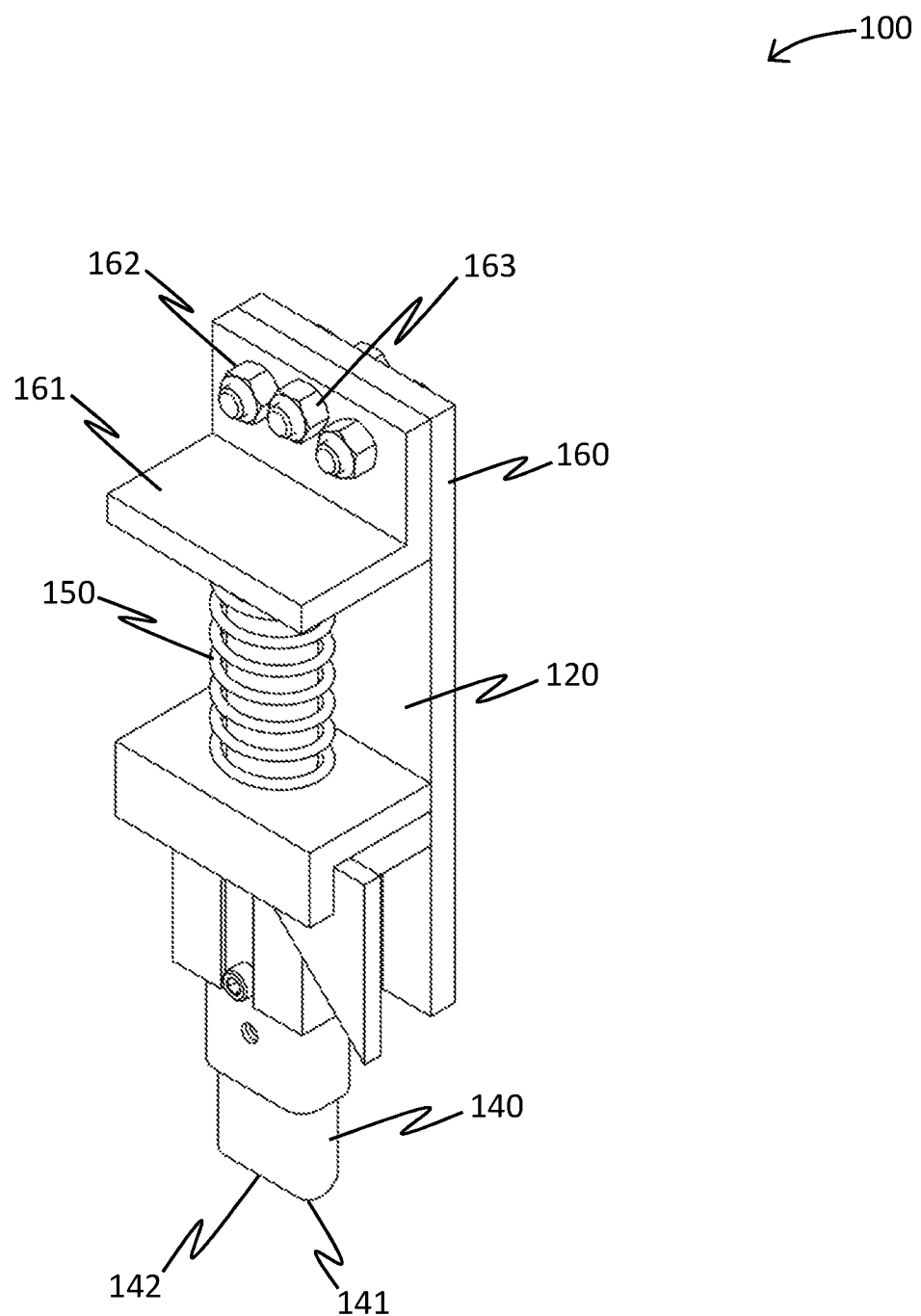
FIG. 2 is a side perspective view of the apparatus for a dump truck of FIG. 1, according to an embodiment of the present disclosure.

FIG. 2 shows the apparatus 100 for a dump truck 10 of FIG. 1, according to an embodiment of the present disclosure. As above, the apparatus 100 may include a latch 120 configured to secure the tailgate 25 (see FIG. 1) in the closed state 40 (see FIG. 1), a return spring 150, and a follower 140 fixed to the latch 120. The follower may include a first end 141 having a pointed portion 142. The latch 120, the follower 140 and the return spring 150 of the apparatus 100 may be coupled to a mounting bracket 160 having an upper plate 161. The mounting bracket 160 may be mechanically fixed via mounting hardware 162 including at least one screw 163.

Figure 3:
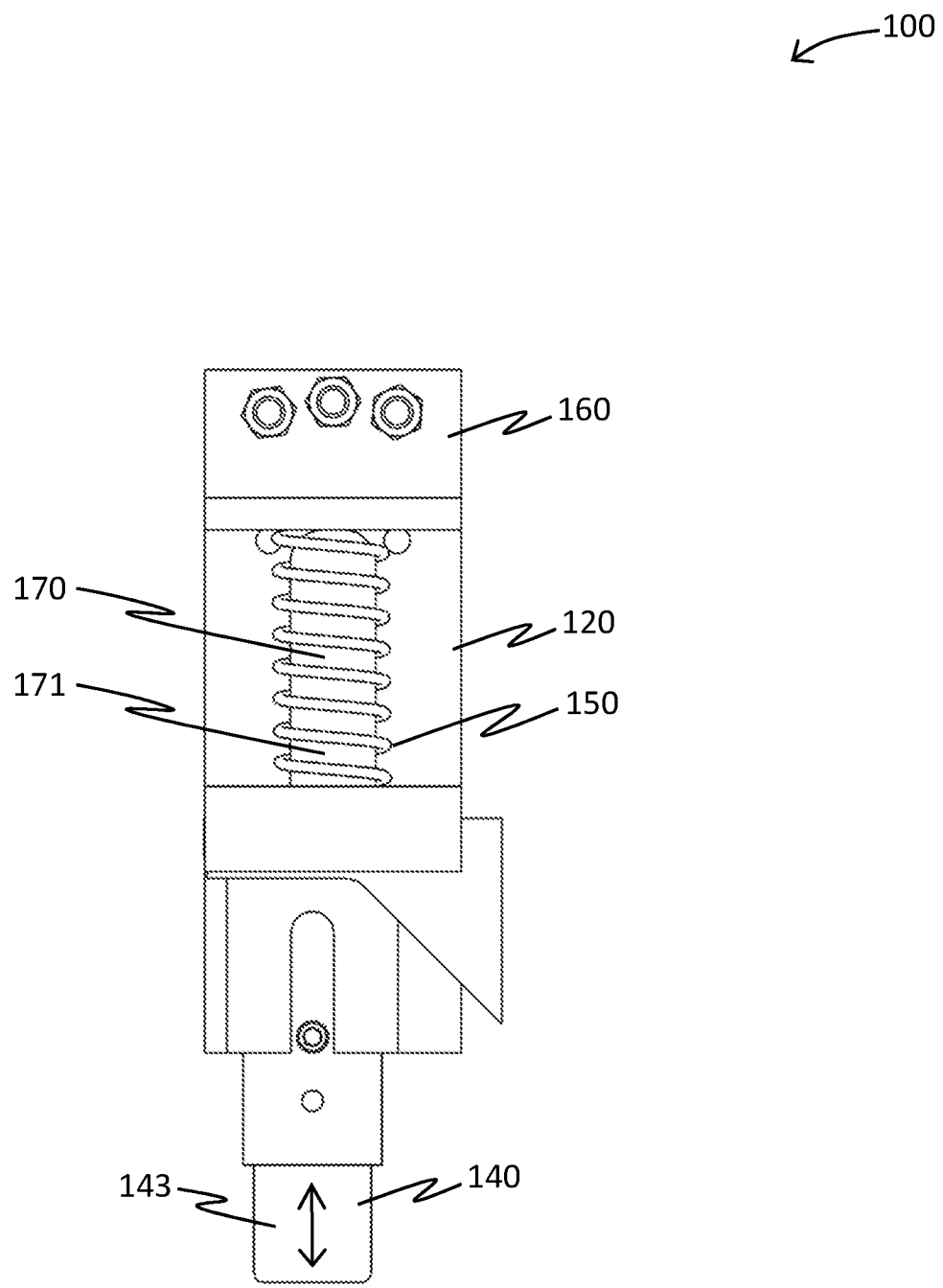
FIG. 3 is a front view of the apparatus for a dump truck of FIG. 1, according to an embodiment of the present disclosure.

FIG. 3 is a front view of the apparatus 100 for a dump truck 10 of FIG. 1, according to an embodiment of the present disclosure. Here again, the apparatus 100 may include a latch 120, a return spring 150, and a follower 140 mechanically fixed in combination to a dump truck 10 (see FIG. 1) via a mounting bracket 160. The follower may be configured to move in a vertical motion 143. The apparatus 100 may also feature a pneumatic actuation assembly 170. The pneumatic actuation assembly 170 may include an air cylinder 171.

Figure 4:
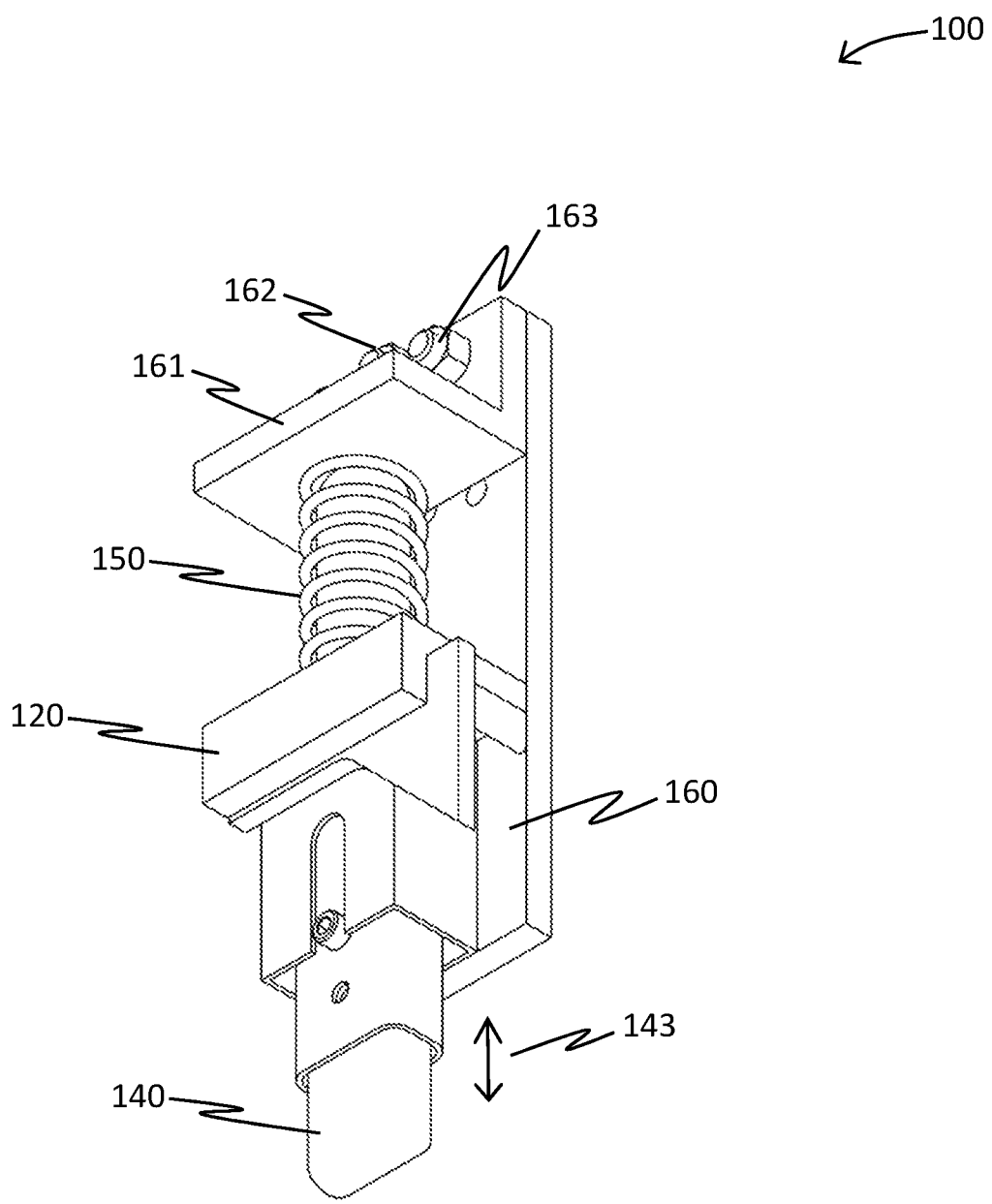
FIG. 4 is a lower perspective view of the apparatus for a dump truck of FIG. 1, according to an embodiment of the present disclosure.

FIG. 4 is a lower perspective view of the apparatus 100 for a dump truck 10 of FIG. 1, according to an embodiment of the present disclosure. As above, the apparatus 100 may include a latch 120, a return spring 150, and a follower 140 mechanically fixed in combination to a dump truck 10 (see FIG. 1) via a mounting bracket 160. The follower may be configured to move in a vertical motion 143. The mounting bracket 160 may feature an upper plate 161 configured to provide support for the apparatus 100. The mounting bracket 160 may be mechanically fixed via mounting hardware 162 including at least one screw 163.

Figure 5:
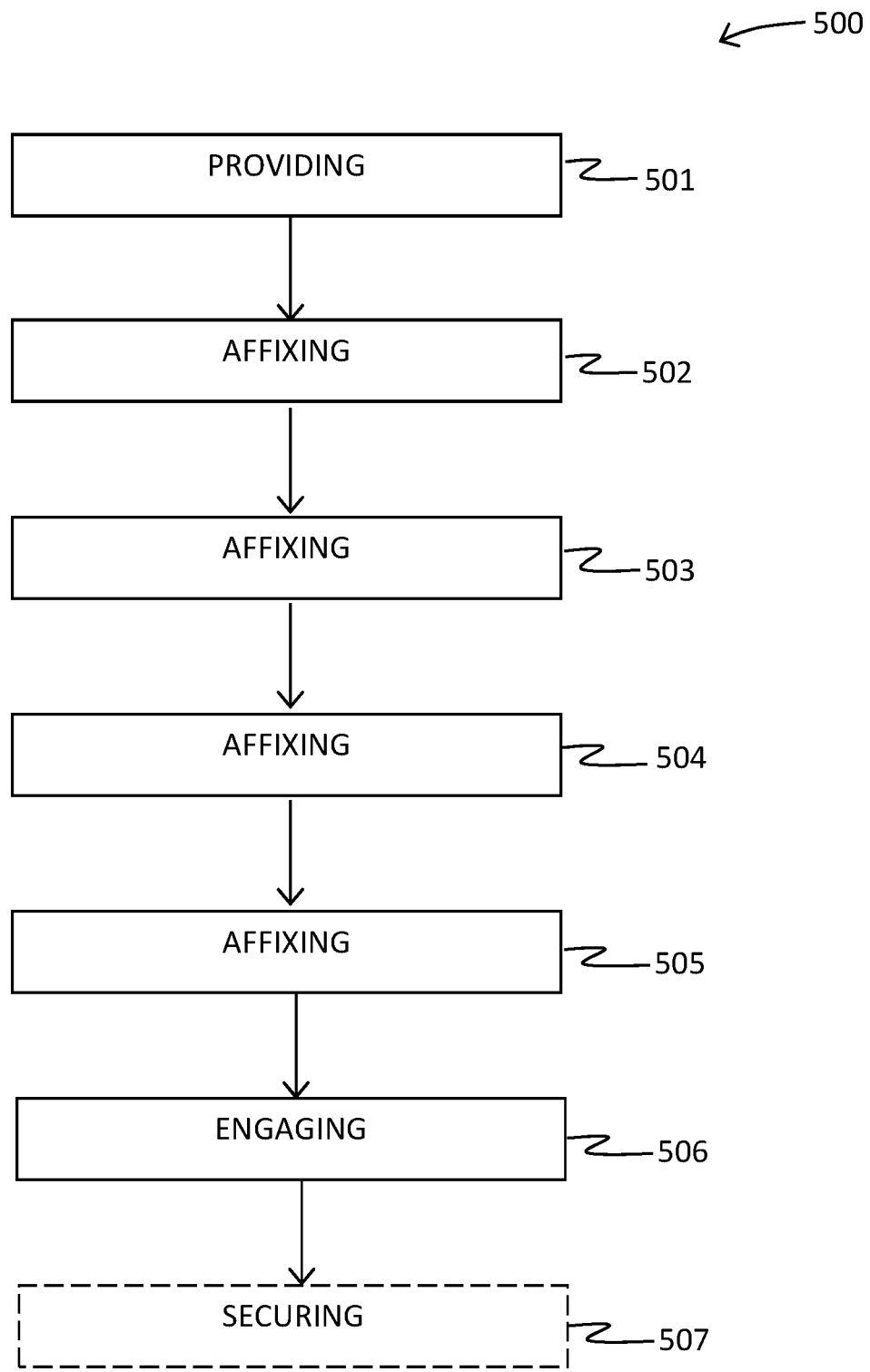
FIG. 5 is a flow diagram illustrating a method of locking a tailgate of a dump truck, according to an embodiment of the present disclosure.

FIG. 5 is a flow diagram illustrating a method 500 of locking a tailgate of a dump truck, according to an embodiment of the present disclosure. In particular, the method 500 of locking a tailgate of a dump truck may include one or more components or features of the apparatus 100 for a dump truck as described above. As illustrated, the method 500 of locking a tailgate of a dump truck may include the steps of: step one 501, providing a tailgate locking apparatus including a catch affixable to one of the tailgate and the open-box bed of the dump truck, a latch affixable to the other of the tailgate and the open-box bed of the dump truck, the latch having an engaged state with the catch and a disengaged state with the catch, in the engaged state, the latch configured to secure the tailgate in the closed state, in the disengaged state, the latch configured to free the tailgate to enter the open state, a face cam affixable to the chassis of the dump truck, a follower fixed to the latch, and configured to ride the face cam as the open-box bed moves relative to the chassis, when the face cam and the latch are affixed to the dump truck, and a return spring affixable to the other of the tailgate and the open-box bed, and coupled to the follower, the return spring and the follower together configured to normally hold the latch in the engaged state with the catch, and to move the latch to the disengaged state as the open-box bed is lifted relative to the chassis; step two 502, affixing the catch to one of the tailgate and the open-box bed of the dump truck; step three 503, affixing the latch to the other of the tailgate and the open-box bed of the dump truck; step four 504, affixing the face cam to the chassis of the dump truck; step five 505, affixing the return spring to the other of the tailgate and the open-box bed; and step six 506, engaging the latch by securing the face cam with the catch.

It should be noted that step seven 507, securing the tailgate in a closed state, is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the apparatus for a dump truck, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An apparatus for a dump truck, the dump truck including a chassis, an open-box bed, a tailgate, and top hinges, the tailgate being configured to pivot up on the top hinges to an open state and pivot down to a closed state as the open-box bed moves relative to the chassis, the apparatus comprising:
    a catch affixable to one of the tailgate and the open-box bed of the dump truck;
    a latch affixable to the other of the tailgate and the open-box bed of the dump truck, the latch having an engaged state with the catch and a disengaged state with the catch, in the engaged state, the latch configured to secure the tailgate in the closed state, in the disengaged state, the latch configured to free the tailgate to enter the open state;
    a face cam affixable to the chassis or the open-box bed of the dump truck;
    a follower fixed to the latch, and configured to ride the face cam as the open-box bed moves relative to the chassis, when the face cam and the latch are affixed to the dump truck; and
    a return spring affixable to the other of the tailgate and the open-box bed, and coupled to the follower, the return spring and the follower together configured to normally hold the latch in the engaged state with the catch, and to move the latch to the disengaged state as the open-box bed is lifted relative to the chassis.

2. The apparatus of claim 1, further comprising a mounting bracket affixable to the other of the tailgate and the open-box bed; and
    wherein the latch, the follower and the return spring are coupled to the mounting bracket having an upper plate.

3. The apparatus of claim 2, wherein an upper end of the return spring is fixedly attached to the upper plate.

4. The apparatus of claim 1, wherein a first end of the follower has a pointed portion.

5. The apparatus of claim 1, wherein the face cam has a curved shape.

6. The apparatus of claim 1, wherein the follower moves in a vertical motion from the engaged state to the disengaged state.

7. The apparatus of claim 1, wherein the apparatus includes a pneumatic actuation assembly.

8. The apparatus of claim 7, wherein the pneumatic actuation assembly includes an air cylinder.

9. The apparatus of claim 2, wherein the mounting bracket is mechanically fixed to the tailgate via a mounting hardware.

10. The apparatus of claim 9, wherein the mounting hardware includes at least one screw.

11. The apparatus of claim 1, wherein the apparatus weighs less than 10 lbs.

12. The apparatus of claim 1, wherein the apparatus comprises metal.

13. The apparatus of claim 1, wherein the catch is integrated with the one of the tailgate and the open-box bed of the dump truck.

14. An apparatus for a dump truck, the dump truck including a chassis, an open-box bed, a tailgate, and top hinges, the tailgate being configured to pivot up on the top hinges to an open state and pivot down to a closed state as the open-box bed moves relative to the chassis, the apparatus comprising:
    a catch affixable to one of the tailgate and the open-box bed of the dump truck;
    a latch affixable to the other of the tailgate and the open-box bed of the dump truck, the latch having an engaged state with the catch and a disengaged state with the catch, in the engaged state, the latch configured to secure the tailgate in the closed state, in the disengaged state, the latch configured to free the tailgate to enter the open state;
    a face cam affixable to the chassis or the open-box bed of the dump truck;
    a follower fixed to the latch, and configured to ride the face cam as the open-box bed moves relative to the chassis, when the face cam and the latch are affixed to the dump truck; and
    a return spring affixable to the other of the tailgate and the open-box bed, and coupled to the follower, the return spring and the follower together configured to normally hold the latch in the engaged state with the catch, and to move the latch to the disengaged state as the open-box bed is lifted relative to the chassis;
    further comprising a mounting bracket affixable to the other of the tailgate and the open-box bed;
    wherein the latch, the follower and the return spring are coupled to the mounting bracket having an upper plate;
    wherein an upper end of the return spring is fixedly attached to the upper plate;
    wherein a first end of the follower has a pointed portion;
    wherein the face cam has a curved shape;
    wherein the follower moves in a vertical motion from the engaged state to the disengaged state;
    wherein the apparatus includes a pneumatic actuation assembly;
    wherein the pneumatic actuation assembly includes an air cylinder;
    wherein the mounting bracket is mechanically fixed to the tailgate via a mounting hardware;
    wherein the mounting hardware includes at least one screw;
    wherein the apparatus weighs less than 10 lbs;
    wherein the apparatus comprises metal; and
    wherein the catch is integrated with the one of the tailgate and the open-box bed of the dump truck.

15. The device of claim 14, further comprising set of instructions; and
    wherein the apparatus is arranged as a kit.

16. A method of locking a tailgate of a dump truck, the dump truck including a chassis, an open-box bed, the tailgate, and top hinges, the tailgate being configured to pivot up on the top hinges to an open state and pivot down to a closed state as the open-box bed moves relative to the chassis, the method comprising:

provi­ding a tailgate locking apparatus including
- a catch affixable to one of the tailgate and the open-box bed of the dump truck,
- a latch affixable to the other of the tailgate and the open-box bed of the dump truck, the latch having an engaged state with the catch and a disengaged state with the catch, in the engaged state, the latch configured to secure the tailgate in the closed state, in the disengaged state, the latch configured to free the tailgate to enter the open state,
- a face cam affixable to the chassis of the dump truck,
- a follower fixed to the latch, and configured to ride the face cam as the open-box bed moves relative to the chassis, when the face cam and the latch are affixed to the dump truck, and
- a return spring affixable to the other of the tailgate and the open-box bed, and coupled to the follower, the return spring and the follower together configured to normally hold the latch in the engaged state with the catch, and to move the latch to the disengaged state as the open-box bed is lifted relative to the chassis;

affixing the catch to one of the tailgate and the open-box bed of the dump truck;

affixing the latch to the other of the tailgate and the open-box bed of the dump truck;

affixing the face cam to the chassis of the dump truck;

affixing the return spring to the other of the tailgate and the open-box bed; and engaging the latch by securing the face cam with the catch.

17. The method of claim 16, wherein the tailgate locking apparatus further includes a mounting bracket affixable to the other of the tailgate and the open-box bed;
- wherein the latch, the follower, and the return spring are coupled to the mounting bracket; and
- wherein the steps of affixing the latch and the return spring to the other of the tailgate and the open-box bed of the dump truck include affixing the mounting bracket to the other of the tailgate and the open-box bed.

18. The method of claim 16, further comprising the step of securing the tailgate in a closed state.

* * * * *